3,518,245
AZO DYESTUFFS AND THEIR METAL
COMPLEX COMPOUNDS
Fritz Meininger, Frankfurt am Main, and Hans Helmut Steuernagel, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Dec. 19, 1966, Ser. No. 602,585
Claims priority, application Germany, Dec. 24, 1965,
F 47,999
Int. Cl. C07c 107/08; C09b 45/14
U.S. Cl. 260—150       7 Claims

ABSTRACT OF THE DISCLOSURE

Azo dyestuffs and metal complex compounds thereof comprising a diazo component and as coupling component a β-naphthol-sulfonic acid substituted by a phenyl urea group that contains on the phenyl a fiber-reactive vinyl sulfone or an ethyl sulfone group substituted in β-position by a radical capable of being split off.

---

CROSS-REFERENCE TO RELATED APPLICATIONS

U.S. application Ser. No. 490,081 filed Sept. 24, 1965, now U.S. Pat. No. 3,419,542 granted Dec. 1, 1968.

The present invention provides new valuable azo dyestuffs and their metal complex compounds as well as a process for preparing them; in particular, the invention provides azo dyestuffs which in their acid form correspond to the general formula

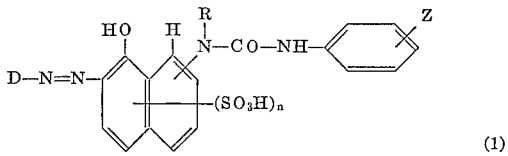

(1)

wherein D represents the radical of a diazo component which may contain additional substituents, in particular groups imparting solubility in water and, if desired azo groups, R represents a hydrogen atom or an alkyl radical, $n$ stands for 1 or 2, Z represents a group of the formulae $$-SO_2-CH=CH_2 \quad (2)$$

or $$-SO_2-CH_2-CH_2-X \quad (3)$$

and X represents an inorganic or organic radical which can be split off by an alkaline agent.

The process for preparing the hitherto unknown dyestuffs of Formula 1 consists in preparing them according to methods known from the literature by diazotization and coupling or by condensation and, if desired, converting the metal-free dyestuffs obtained in this manner into their metal complex compounds according to known methods, provided that they contain, in the radical D, in ortho-position to the azo bridge a substituent which is capable of forming metal complexes or being converted into such a substituent.

As radical D of a diazo component which participates in the formation of the azo dyestuffs of the general Formula 1 obtainable according to the process of the present invention there may be mentioned, for example, a radical of the benzene, naphthalene, azobenzene, azonaphthalene, benzene-azonaphthalene, diphenyl or stilbene series.

The solubilizing groups which may be contained in said radical D of the diazo component are in the first place acid groups imparting solubility in water such, for example, as sulfonic acid or carboxylic acid groups, moreover low-molecular alkylsulfonyl groups as well as sulfonic acid amide groups or carboxylic acid amide groups. In addition, the radical D may contain further substituents which are usually present in azo dyestuffs, for instance halogen atoms such as chlorine or bromine atoms, alkyl, alkoxy, acyl, acylamino, arylamino, hydroxy, nitro, cyano and trifluoromethyl groups as well as heterocyclic radicals. These groups may be linked in any position to the diazo component and may be distributed on the annulated rings.

As inorganic or organic radicals X which are split off by the action of alkaline agents there may be mentioned for example the following: halogen atoms such as a chlorine or bromine atom, an alkyl-sulfonic acid ester group or arylsulfonic acid ester group, moreover acyloxy groups such as an acetoxy group, furthermore a sulfuric acid or thiosulfuric acid ester group as well as a phenoxy group or a dialkylamino group such, for example, as a dimethyl- or diethylamino group.

The preparation of the new metal-free azo dyestuffs of the general Formula 1 by coupling is advantageously carried out by uniting the diazonium compound of any aromatic amine with a coupling component of the general Formula 4.

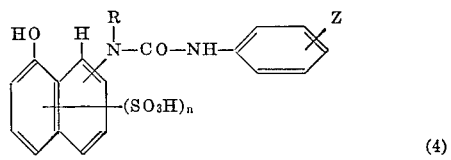

(4)

in which R, Z and $n$ have the meanings given above.

The coupling of the coupling components of Formula 4 with diazotized amines according to the process of the invention can be carried out by known methods, in particular under weakly acid, neutral or weakly alkaline conditions. Especially when coupling in a weakly alkaline range it is advisable to operate at the lowest temperature possible—preferably below 40° C.—in order to avoid undesirable side reactions which may cause, in particular, the loss of substituent X or the addition of water to the double linkage of the vinyl-sulfonyl group.

The above-mentioned diazonium compounds of primary aromatic amines which are used as starting substances in the process of the present invention can be obtained from the corresponding amines by known methods, for example by treatment with sodium nitrite in the presence of mineral acids, in particular in the presence of hydrochloric acid. The diazotization may likewise be effected by means of nitrosylsulfuric acid or in the presence of α-naphthalenesulfonic acid. The following amines may serve as examples of diazotizable amines suitable for use in the process of the present invention:

1-aminobenzene,
1-aminobenzene-2-sulfonic acid,
1-aminobenzene-3-sulfonic acid,
1-aminobenzene-4-sulfonic acid,
1-aminobenzene-2,5-disulfonic acid,
1-amino-4-chlorobenzene-2-sulfonic acid,
1-amino-4-methyl-5-chlorobenzene-2-sulfonic acid,
1-amino-4-methylbenzene-2-sulfonic acid,
1-amino-3-trifluoromethyl-benzene-6-sulfonic acid,
1-amino-3,4-dichlorobenzene-6-sulfonic acid,
1-amino-4-methoxy-benzene-6-sulfonic acid,
1-amino-3-methoxybenzene-6-sulfonic acid,
1-amino-3-methylbenzene-4-sulfonic acid, moreover, ortho-, meta- and para-toluidine, ortho-anisidine, chloro- and nitroaniline, 1-aminobenzene-3-carboxylic acid and 1-aminobenzene-6-carboxylic acid,
1-amino - 3 - (2',4'-dichlorotriazinyl-6') - aminobenzene-6-sulfonic acid,
1-aminonaphthalene-4-sulfonic acid,
1-aminonaphthalene-5-sulfonic acid,
1-aminonaphthalene-6-sulfonic acid and
1-aminonaphthalene-7-sulfonic acid,
2-aminonaphthalene-1-sulfonic acid,
2-aminonaphthalene-4-sulfonic acid,
2-aminonaphthalene-6-sulfonic acid,
2-aminonaphthalene-7-sulfonic acid and
2-aminonaphthalene-8-sulfonic acid,
1-aminonaphthalene-3,6-disulfonic acid,
2-aminonaphthalene-1,5-disulfonic acid,
2-aminonaphthalene-3,6-disulfonic acid,
2-aminonaphthalene-4,8-disulfonic acid,
2-aminonaphthalene-5,7-disulfonic acid,
2-aminonaphthalene-6,8-disulfonic acid,
1-(3'- or 4' - aminobenzoyl) - aminobenzene - 3-sulfonic acid,
3-aminopyrene-5,8-disulfonic acid and
3-aminopyrene-5-10-disulfonic acid,
4-nitro-4'-amino-stilbene-2,2'-disulfonic acid and
dihydrothiotoluidine sulfonic acids as well as primary aromatic amines containing azo groups, for instance 4-amino-azobenzene-(1,1')-2,4'-disulfonic acid.

If conversion of the metal-free azo dyestuffs obtained according to the process of the invention into their metal complex compounds is desired, the following diazotizable amines may be used for example: 2-aminobenzene-1-carboxylic acid-4-sulfonic acid, 2-aminobenzene-1-carboxylic acid-5-sulfonic acid, 2-aminobenzene-1-carboxylic acid, nitroaminobenzene-carboxylic acids or aminohydroxybenzenes such as 4-methyl-, 4-chloro- or 4-nitro-2-amino-1-hydroxybenzene, 6-acetylamino-, 6-chloro- or 6 - nitro-2-amino - 1 - hydroxybenzene-4-sulfonic acid, 2-amino-1-hydroxy-benzene-4-sulfonic acid, 2-amino-1-hydroxybenzene-5-sulfonic acid, 4 - nitro-6-acetylamino - 2-amino-1-hydroxybenzene, 4-nitro - 6 - chloro-2-amino-1-hydroxybenzene, 4-chloro- or 4-nitro-2-amino-1-hydroxybenzene-6-sulfonic acid, 4,6 - dinitro- or 4,6 - dichloro-2-amino-1 - hydroxybenzene, 2-amino-1-hydroxybenzene-4-sulfonic acid amide or 2 - amino - 1 - hydroxybenzene-5-sulfonic acid amide and 3-amino - 2 - hydroxybenzene-1-carboxylic acid-5-sulfonic acid.

The above-mentioned coupling components of the general Formula 4 which may be used for the coupling, if desired in the form of their alkali metal salts, can be prepared in simple manner by reacting naphthalene derivatives of the general Formula 5

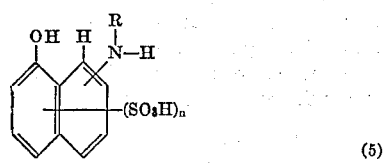

(5)

which contain an amino group capable of being acylated, with isocyanates or carbamic acid derivatives of the general Formulae 6 or 7

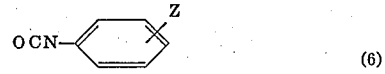

(6)

or

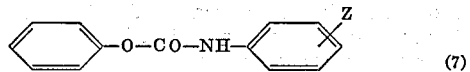

(7)

wherein R, Z and $n$ are defined as above.

The isocyanates of Formula 6 and the carbamic acid derivatives of Formula 7 are new compounds which can be obtained from the corresponding arylamines, for instance by reaction of the amino group with phosgen or by condensation with chloroformic acid phenylester.

Among the naphthalene derivatives of Formula 5 which are suitable for use in the process of the invention there may be mentioned, for example 2-amino-8-hydroxynaphthalene-6-sulfonic acid, 2 - amino-8-hydroxynaphthalene-3,6-di-sulfonic acid, 2-amino - 5 - hydroxynaphthalene-7-sulfonic acid, 2-amino-5-hydroxynaphthalene-1,7-disulfonic acid, 1-amino - 5 - hydroxy-naphthalene-7-sulfonic acid, 1-amino-5-hydroxynaphthalene - 3,7-disulfonic acid as well as derivatives of these compounds, which are monoalkylated to the nitrogen atom, such, for example, as 2-(N-methylamino)-8-hydroxy-naphthalene-6-sulfonic acid.

Suitable isocyanates and carbamic acid derivatives of Formula 6 or 7 respectively which may be used for the reaction with the naphthalene derivatives of Formula 5 are for example 4-vinylsulfonylphenyl-1-isocyanate, 3-vinylsulfonylphenyl - 1 - isocyanate, 4-(β-chloroethylsulfonyl)-phenyl - 1 - isocyanate, 3-(β-chloroethylsulfonyl)-phenyl-1-isocyanate, 2 - (β-chloroethylsulfonyl)-phenyl-1-isocyanate, moreover β-hydroxyethylsulfonyl-phenylisocyanates wherein the hydroxy group in β-position is esterified, for example, with methane-sulfonic acid, benzene-sulfonic acid, para-toluene-sulfonic acid or acetic acid, 3- or 4 - (β-phenoxy-ethylsulfonyl)-phenyl - 1 - isocyanate as well as the condensation products of 1 mol of chloroformic acid phenylester with 1 mol of 3- or 4-aminophenyl-1-(β-sulfatoethyl)-sulfone.

If the amines, the diazo compounds of which are used for the preparation of the metal-free dyestuffs of Formula 1, contain in ortho-position to the amino group, a grouping capable of forming metal complexes or of being converted into such a grouping, for example a carboxyl group, a hydroxy group or an alkoxy group, such as a methoxy group, the metal-free dyestuffs obtained which correspond to Formula 1 can be transformed by known methods into their metal complexes, for example their copper, nickel, chromium or cobalt complexes. For the preparation of the metal complex compounds the o,o'-dihydroxy-azo-dyestuffs or o-carboxy-o'-hydroxy-azo dyestuffs obtainable according to the process of the present invention are reacted with an agent yielding metal. If desired, the metal complex compounds of o,o'-dihydroxy-azo dyestuffs can also be obtained in an indirect manner by coppering o-alkoxy-o'-hydroxy-azo dyestuffs with dealkylation or by treating o'-hydroxy-azo dyestuffs which contain a hydrogen atom in ortho-position to the azo bridge, in a weakly acid solution with copper salts and with an oxidizing agent. Subsequently, the copper complex compounds obtained in this manner can be decoppered, if desired, for example by treatment with mineral acids, and then converted into the metallized o,o'-dihydroxy-azo dyestuffs by means of another agent yielding metal.

As agents yielding metal there may be used according to the process of the invention compounds which yield copper, nickel, chromium or cobalt. Suitable for this purpose are, for example, the salts of the metals cited, for instance chromium sulfates, cobalt acetate, cobalt sulfate, copper acetate or copper sulfate. There may, however, also be used metallizing agents containing complex-bound metal, such as for example complex chromium or cobalt compounds of aliphatic hydroxycarboxylic acids or dicarboxylic acids and chromium complex compounds or aromatic o-hydroxycarboxylic acids such, for example, as salicylic acid, moreover complex cobalt or copper compounds of the alkali metal salts of aliphatic hydroxycarboxylic acids. Suitable aliphatic hydroxycarboxylic acids are, for example, citric acid, lactic acid, glycolic acid and, above all, tartaric acid.

The reaction of the metal-free azo dyestuffs of the general Formula 1 with the agents yielding metal is advantageously carried out in the heat. It is expedient to heat the aqueous metallization mixture in a weakly acid to neutral range to temperatures between 20° C. and 130° C., if desired under reflux or in a closed vessel. If necessary, organic solvents such as alcohol or dioxane may be added or the reaction may be carried out in the presence of further agents accelerating the formation of complexes such, for example, as the salts of organic acids.

The metal complex dyestuffs obtainable according to the process of the present invention may contain one complex-bound metal atom each in 1 or 2 dyestuff molecules. In the case of chromium or cobalt, the molar ratio of the metal to the azo dyestuff is preferably 1:2, whereas the complex compounds obtained with the use of agents yielding copper or nickel contain one metal atom per molecule of dyestuff.

The formation of the dyestuffs of the general Formula 1 can likewise be achieved by reacting metal-free azo dyestuffs of the general Formula 8

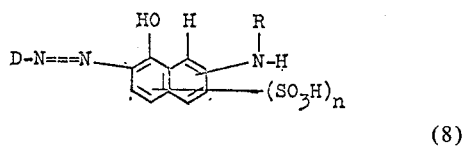

(8)

wherein D, R and $n$ are defined as above and which contain an amino group capable of being acylated, with isocyanates of Formula 6. The necessary starting substances of Formula 8 can be obtained in simple manner by coupling the diazonium compound of any aromatic amine with a coupling component of Formula 5.

According to a particular variation of the process described for the manufacture of metal complex dyestuffs of the Formula 1 it is advantageous to metallize the starting substances of Formula 8—provided they contain in ortho-position to the azo bridge a hydrogen atom or a substituent capable of forming metal complexes—according to known methods, prior to the reaction with the isocyanates of Formula 6.

The reaction described above is preferably carried out by adding an isocyanate of Formula 6 at a relatively low temperature, advantageously within the range from about 0° to 50° C., and with careful stirring, to the aqueous solution of the metal-free starting dyestuff of Formula 8, which contains an amino group capable of being acylated, or the metal complex compound thereof, the solution showing a weakly alkaline or weakly acid, preferably a neutral reaction. The acylating components of Formula 6 can be used as such, for example in the form of a powder, if desired with addition of an emulsifier in order to obtain a better dispersion in the aqueous phase, or dissolved in a suitable organic solvent such as benzene, toluene, chlorobenzene or acetone.

The dyestuffs of the general Formula 1 obtained according to the process of the invention as well as their metal complex compounds and the coupling components of Formula 4 used for the preparation of said dyestuffs, may be modified in the grouping Z within the limits indicated for Z by the groups of Formulae 2 and 3. It is possible, for instance, to convert the radical of Formula 3 into the radical of Formula 2 by splitting off HX by means of an alkaline agent or to convert the vinylsulfonyl group of Formula 2 by reaction with sodium thiosulfate in a weakly acid aqueous medium into a β-thiosulfatoethylsulfonyl group (Formula 3, X=—S—SO$_3$H) or with dialkyl amine into a β-dialkylaminoethyl-sulfonyl group (Formula 3, X=N(Alkyl)$_2$). It is furthermore possible to convert a β-halogeno-ethylsulfonyl group (Formula 3, X=halogen) into a β-thiosulfato-ethylsulfonyl group (Formula 3, X=—S—SO$_3$H), by heating it with sodium thiosulfate in an aqueous to neutral solution, as is known from the literature when preparing Bunte salts from alkyl halides and sodium thiosulfates.

The products of the invention may be isolated from the medium in which they were formed either in their metal-free form or as complex compounds, according to known methods, for example in the form of an alkali metal salt by salting out with sodium or potassium chloride, or by spray-drying of the neutralized reaction mixture.

In the form of their alkali metal salts, the dyestuffs obtained according to the process of the invention are soluble in water and may be used for dyeing and printing various kinds of materials, for example silk, wool, leather, synthetic polyamides and polyurethanes, regenerated protein and cellulose materials, in the first place, however, cotton, linen and viscose rayon.

The new dyestuffs are applied to cellulose material in the presence of acid-binding agents according to the dyeing and printing processes generally used in industry. They may also be used for the dyeing of wool, silk, regenerated proteins, polyamides and modified acrylonitrile materials according to the usual dyeing processes in weakly acid, neutral or weakly alkaline dyestuff solutions. The dyeings and prints obtained with the use of these dyestuffs are usually distinguished by high tinctorial strength, purity of shade, a good fastness to light and to wet processing and especially by a very good resistance to washing.

If the dyestuffs contain groups capable of forming metal complexes, for example o - carboxy - o' - hydroxy groups, o,o' - dihydroxy groups or o - hydroxy - carboxy groups which are present, for example, in salicylic acid derivatives, the metal-free dyeings may be treated on the material with agents yielding metal.

The following examples illustrate the invention but they are not intended to limit it thereto, the parts and percentages being by weight unless otherwise mentioned and the relationship of parts by weight to parts by volume being the same as that of the kilogram to the liter.

Example 1

(a) 23.9 parts of 2 - amino - 8 - hydroxy-naphthalene-6-sulfonic acid are introduced into 200 parts of water with an addition of a sodium hydroxide solution of 33% strength at a pH-value in the range of from 6 to 7. A solution of 35 parts of 3 - (β - chloroethylsulfonyl)-phenyl - 1 - isocyanate (melting point: 83° C.) in 100 parts of chlorobenzene, which has been heated to a temperature ranging from 40 to 50° C. is added, while very carefully stirring, and stirring is continued at a pH ranging from 6.5 to 7 until the starting product has reacted. During the first hour, the batch is diluted with 200 parts of water. The chlorobenzene is then distilled off in vacuo and the residue of the flask is made up to 500 parts by volume with water.

(b) 30.3 parts of 2 - amino - naphthalene - 1,5 - disulfonic acid are completely diazotized with 20 parts by volume of a 5 N sodium nitrite solution in 200 parts of water and 30 parts of hydrochloric acid of 37% strength, at 0 to 5° C. The excess amount of acid is neutralized with a saturated soda solution to give a Congo neutral reaction and then the solution of (a) is added thereto. The coupling is allowed to terminate at a pH in the range of from 6.5 to 7 without further cooling, the whole is diluted to 1,700 parts by volume with water, is clarified after an addition of 10 parts of kieselguhr at 35–40° C. and then the dyestuff is salted out by introducing sodium chloride. The whole is filtered, washed with a dilute sodium chloride solution and the filter residue is dried at 60° in vacuo. There is obtained a dyestuff which in the form of the free acid corresponds to the formula

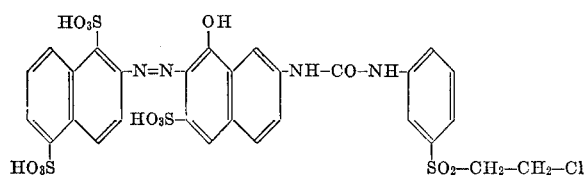

as a dark red powder.

On dyeing cotton in aqueous alkaline solutions, the product yields strong clear yellowish red tints having good fastness properties to light and wet processing.

Example 2

(a) 31.9 parts of 2-amino-8-hydroxynaphthalene-3,6-disulfonic acid are dissolved in 200 parts of water at a pH in the range of from 6.5 to 7 with an addition of a sodium hydroxide solution. 25 parts of 4-vinylsulfonyl-phenyl-1-isocyanate (melting point: 61° C.) are introduced as a powder into this solution at 0–10° C., while carefully stirring, stirring is continued for 10 hours, the whole is diluted with 200 parts of water and clarified at 40–50° C. 100 parts of potassium chloride are added to the filtrate, the precipitated product of the formula

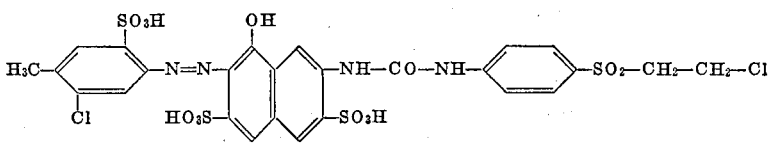

is separated from the mother liquor and washed with a dilute potassium chloride solution.

(b) 6.85 parts of 1-aminobenzene-2-carboxylic acid are diazotized with an aqueous solution of 3.45 parts of sodium nitrite in 100 parts of water and 12 parts of hydrochloric acid of 37% strength at 0–5° C. 30.2 parts of a coupling component of the formula given under (a) are introduced and the pH of the solution is adjusted to 6.5–7 with sodium bicarbonate. When the coupling is complete, sodium chloride is introduced and the precipitated dyestuff which in the form of the free acid corresponds to the formula

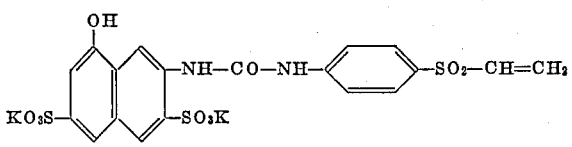

is quickly filtered with suction and dried. A dark red powder is obtained.

(c) 2 parts of the dyestuff powder obtained under (b) are dissolved in 15 parts of water and the solution is stirred with 5 parts of urea, 1 part of sodium bicarbonate and 27 parts of a 4% alginate thickening agent to yield a printing paste. This paste is used for printing cotton which is then dried at 60° C., treated with steam for 5 minutes at a temperature in the range of from 98 to 103° C., washed with hot water and a soap solution, rinsed with water and dried. There is obtained a strong clear red print having good to very good fastness properties to wet processing.

Example 3

(a) 31.9 parts of 2-amino-8-hydroxynaphthalene-3,6-disulfonic acid are dissolved to neutral in 200 parts of water with an addition of a sodium hydroxide solution.

A solution of 35 parts of 4-(β-chloroethyl-sulfonyl)-phenyl-1-isocyanate (melting point: 100° C.) in 90 parts of benzene are added thereto while carefully stirring, and the whole is stirred overnight at a pH of 6.5–7. The benzene is then distilled off.

(b) 22.2 parts of 6-chloro-4-aminotoluene-3-sulfonic acid are diazotized with 17.3 parts of a sodium nitrite solution of 40% strength in 100 parts of water and 20 parts of hydrochloric acid of 37% strength, at 0–5° C. The reaction mixture obtained under (a) is then added and the whole is neutralized with a saturated soda solution. At 0–10° C. and a pH of 6–7, the whole is stirred until the coupling is terminated, made up with 3,000 parts by volume of water, clarified and the dyestuff is salted out with sodium chloride. The precipitated dyestuff which in the form of the free acid corresponds to the formula

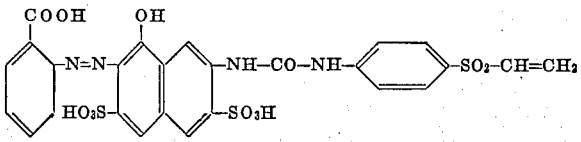

is filtered with suction, washed with a dilute sodium chloride solution and dried.

The product yields strong clear red dyeings and prints on cotton which have good fastness properties to wet processing.

Example 4

(a) 23.9 parts of 2-amino-8-hydroxynaphthalene-6-sulfonic acid are dissolved to neutral in 200 parts of water with an addition of a sodium hydroxide solution. At a pH of 6.5–7 and at room temperature, 40 parts of 2-(β-chloroethyl-sulfonyl)-phenyl-1-isocyanate (an oily compound) are added to this solution while carefully stirring. During the following hour, the whole is diluted with 750 parts of water. After 10 hours, the whole is cleared and 250 parts of sodium chloride are added to the filtrate. The precipitated product is separated from the mother liquor and washed with a dilute aqueous sodium chloride solution.

(b) 17.3 parts of 1-aminobenzene-4-sulfonic acid are diazotized with the aqueous solution of 6.9 parts of sodium nitrite at 0–5° C. in 100 parts of water and 20 parts of hydrochloric acid of 37% strength. The excess amount of acid is neutralized with a soda solution and then the solution of the product obtained under (a) in 1,000 parts of water is added thereto. The coupling is allowed to terminate at a pH of 6.5–7 and at 0–10° C. and the dyestuff is salted out with potassium chloride. The precipitated dyestuff which in the form of the free acid corresponds to the formula

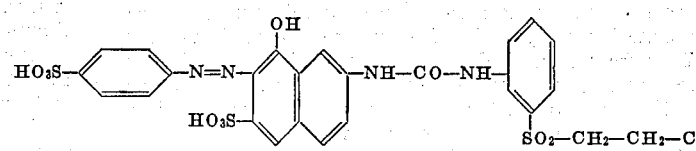

is filtered with suction, washed with a dilute potassium chloride solution and dried at 50° C. in a vacuum dryer. When printed on cotton, the dyestuff yields a scarlet tint.

The following Table I comprises further azo dyestuffs obtainable according to the methods of the invention given in Examples 1 to 4, by coupling the azo components given in column I with the diazonium salts of the amines given in column II. The products obtained dye cotton, the tints mentioned in column III, which are fast to wet processing, according to the direct dyeing or the pad-dyeing methods as well as to the printing process.

TABLE I

| No. | I coupling component | II diazo component | III Tint on cotton |
|---|---|---|---|
| 1 | 1-hydroxy-6-sulfo-naphthalene with 2-NHCONH-C₆H₄-SO₂CH=CH₂ | 2-aminobenzene-1,4-disulfonic acid (HO₃S, SO₃H, NH₂) | Orange. |
| 2 | 1-hydroxy-6-sulfo-naphthalene with 2-NHCONH-C₆H₄-SO₂-CH₂-CH₂Cl | 2-aminobenzenesulfonic acid (SO₃H, NH₂) | Do. |
| 3 | 1-hydroxy-7-sulfo-naphthalene with 4-NHCONH-C₆H₄-SO₂-CH=CH₂ | 2-amino-5-sulfo-naphthalene (SO₃H, NH₂, HO₃S) | Scarlet. |
| 4 | 1-hydroxy-6-sulfo-naphthalene with 2-NHCONH-C₆H₄-SO₂CH₂CH₂Cl | Same as above | Orange. |
| 5 | Same as above | 2-amino-6,8-disulfo-naphthalene (HO₃S, NH₂, HO₃S) | Scarlet. |
| 6 | 1-hydroxy-6-sulfo-naphthalene with 2-NHCONH-C₆H₄-SO₂CH₂CH₂Cl | HO₃S-naphthalene-N=N-C₆H₃(CH₃)-NH₂ with SO₃H, HO₃S | Ruby. |
| 7 | Same as above | 4-anilino-2-sulfo-aniline (NH-, SO₃H, NH₂) | Violet. |
| 8 | do | HO₃S, NH-, NH₂ (anilino sulfo aniline) | Do. |
| 9 | 1-hydroxy-6-sulfo-naphthalene with 2-NHCONH-C₆H₄-SO₂CH₂CH₂Cl | HO₃S-C₆H₃-N=N-C₆H₂(OCH₃)(CH₃)-NH₂ with SO₃H | Do. |
| 10 | Same as above | HO₃S, NH₂, SO₃H (aminobenzene disulfonic acid) | Scarlet. |
| 11 | do | SO₃H, NH-, NH₂ (anilino sulfo aniline) | Violet. |

3,518,245
TABLE I—Continued
| No. | I coupling component | II diazo component | III tint on cotton |
|---|---|---|---|
| 12 | Same as No. 9 | 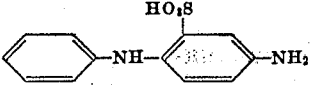 | Violet. |
| 13 | 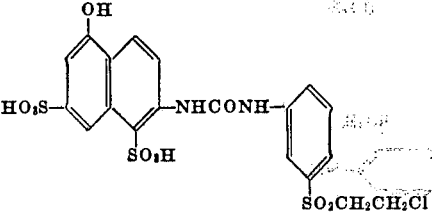 | 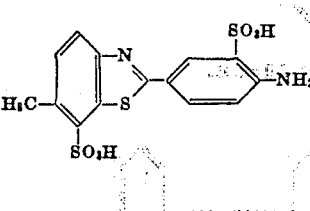 | Reddish orange. |
| 14 | Same as above | 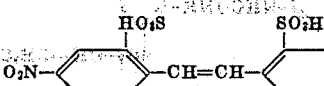 | Red. |
| 15 | 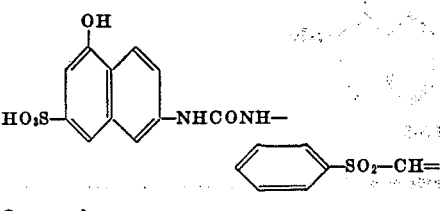 | 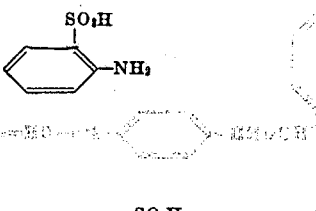 | Orange. |
| 16 | Same as above | 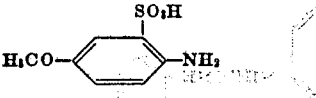 | Scarlet. |
| 17 | 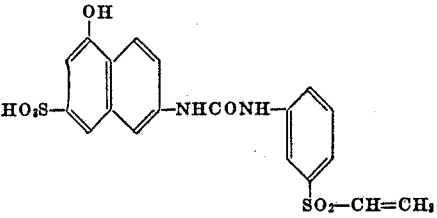 | 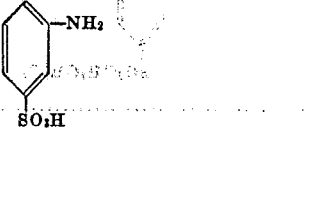 | Orange. |
| 18 | 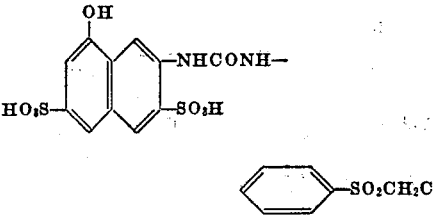 | 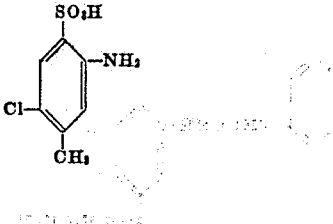 | Scarlet. |
| 19 | 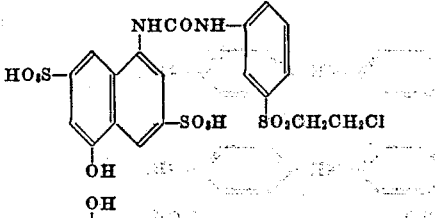 | 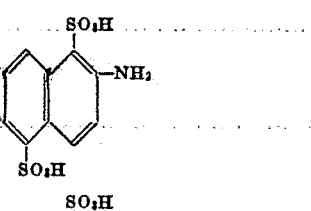 | Red. |
| 20 | 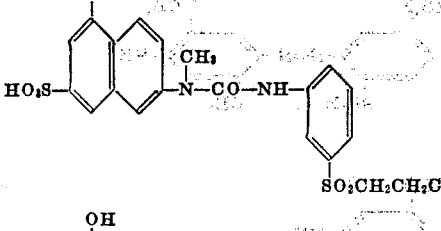 | 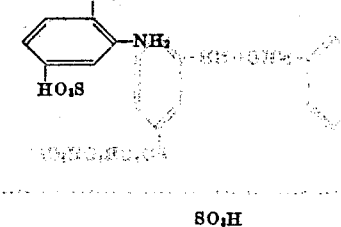 | Orange. |
| 21 | 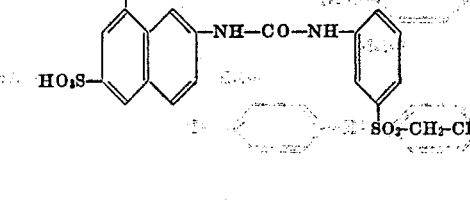 | 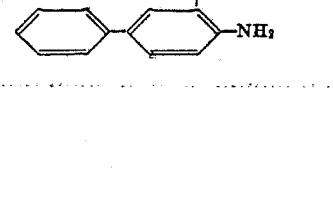 | Red. |

3,518,245
TABLE I—Continued
| No. | I coupling component | II diazo component | III tint on cotton |
|---|---|---|---|
| 22 | 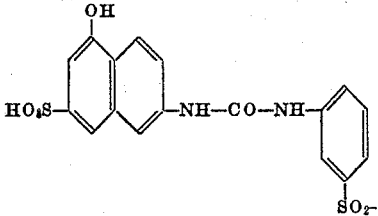 | 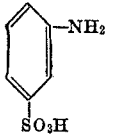 | Orange. |
| 23 | 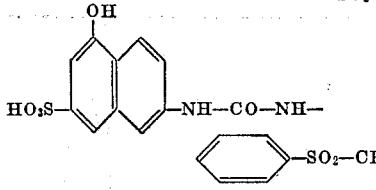 | 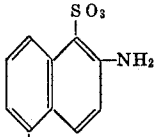 | Do. |
| 24 | Same as above | 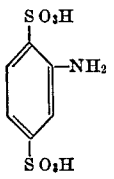 | Do. |
| 25 | 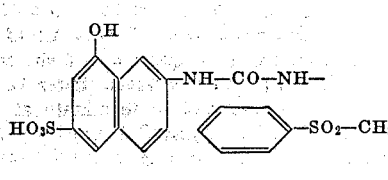 | 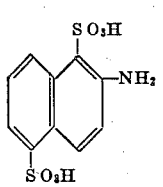 | Scarlet. |
| 26 | 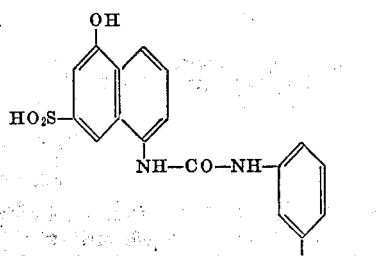 | Same as above | Do. |
| 27 | 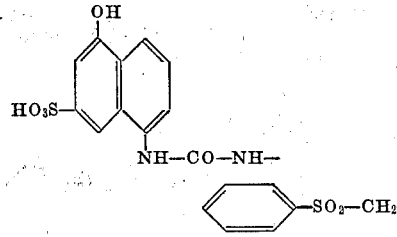 | ......do...... | Do. |
| 28 | 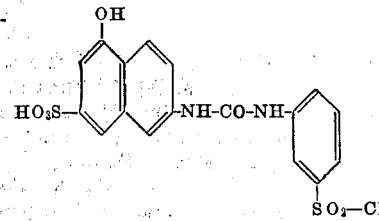 | 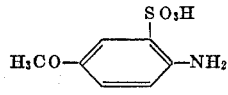 | Do. |
| 29 | 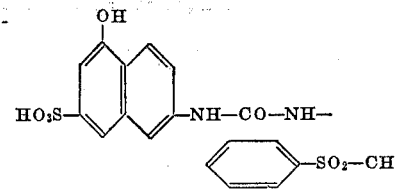 | Same as above | Do. |

TABLE I—Continued

| No. | I coupling component | II diazo component | III tint on cotton |
|---|---|---|---|
| 30 | 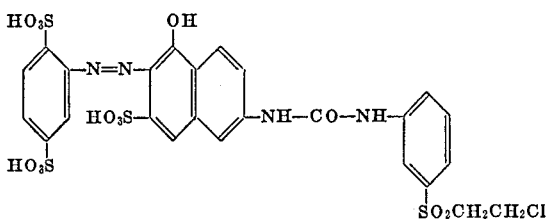 | 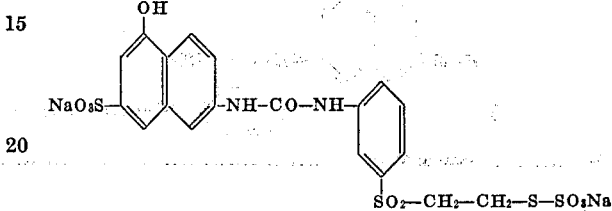 | Orange |

Example 5

253 parts of 1-aminobenzene-2,5-disulfonic acid are diazotized in 1,000 parts of water and 240 parts of hydrochloric acid of 37% strength at 0–5° C. with 172.5 parts of a sodium nitrite solution of 40% strength, 281 parts of 2-acetylamino-5-hydroxy-naphthalene-7-sulfonic acid and 2,000 parts of water are added and the pH-value of the solution is adjusted to 6.5–7 with sodium carbonate. When the coupling is complete, 940 parts of a sodium hydroxide solution of 33% strength are added, the whole is refluxed for 4 hours, the pH-value is again adjusted to 6–7 by means of hydrochloric acid of 37% strength and the batch is allowed to cool to room temperature. A solution of 500 parts of 3-($\beta$-chloroethylsulfonyl)-phenyl-1-isocyanate in 1,200 parts of chlorobenzene, which has been heated to a temperature of 40° C. is added while carefully stirring, and stirring is continued for 12 hours. The chlorobenzene is then distilled off in vacuo, the whole is diluted with 15,000 parts of water, clarified at 40–50° C. and the dyestuff which in the form of the free acid corresponds to the formula

[structure with HO$_3$S, OH, HO$_3$S, HO$_3$S, —N=N—, —NH—CO—NH—, SO$_2$CH$_2$CH$_2$Cl]

is salted out by means of sodium chloride. The precipitated dyestuff is filtered with suction, washed with a dilute sodium chloride solution and dried. When used for dyeing and printing cotton, the product yields brilliant strong orange tints having a very good fastness to light and a good fastness to washing.

Example 6

(a) 23.9 parts of 2-amino-5-hydroxynaphthalene-7-sulfonic acid are converted into a neutral solution 200 parts of water with an addition of a sodium hydroxide solution of 33% strength. A solution of 30 parts of 3-vinylsulfonyl-phenyl-1-isocyanate (melting point: 46° C.) in 60 parts of acetone is introduced while carefully stirring, and stirring is continued at a pH of 6.5–7 until the starting product is consumed.

The batch is heated to a temperature in the range of from 70 to 75° C., at which temperature 26 parts of sodium thiosulfate containing crystal water is introduced while maintaining the pH at 5.8–6.3 by a dropwise addition of acetic acid. Stirring is continued for 3 hours at 70–75° C. and a pH ranging from 5.8 to 6.3, the batch is then diluted to 1,000 parts by volume with water and clarified at 30–40° C. By an addition of sodium chloride, the coupling component of the formula

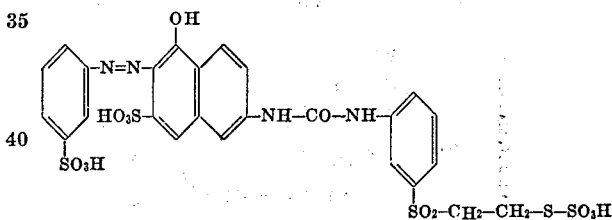

is salted out. The precipitated product is filtered with suction and washed with a sodium chloride solution.

(b) 17.3 parts of 1-aminobenzene-3-sulfonic acid are diazotized with 17.3 parts of a sodium nitrite solution of 40% strength, at 0–5° C., in 150 parts of water and 20 parts of hydrochloric acid of 37% strength. The excess amount of acid is neutralized with a saturated soda solution, the moist product obtained under (a) is added and the coupling is allowed to terminate at 0–10° C. and a pH of 6.5–7. The dyestuff formed which in the form of the free acid corresponds to the formula

[structure with —N=N—, OH, HO$_3$S, SO$_3$H, —NH—CO—NH—, SO$_2$—CH$_2$—CH$_2$—S—SO$_3$H]

is salted out by means of sodium chloride, filtered with suction, washed with a dilute sodium chloride solution and dried. When applied to cotton the product yields clear strong orange dyeings and prints fast to light and wet processing.

The same dyestuff is obtained by converting 66.9 parts of the dyestuff of the formula

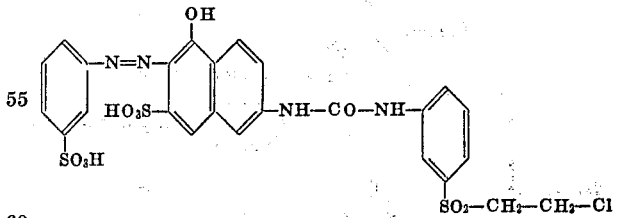

(described in Table I, under 22), into a neutral solution in 500 parts of water, adding 30 parts of a sodium hydroxide solution of 33% strength at 10–20° C., again neutralizing with hydrochloric acid after 10 minutes and then introducing 26 parts of Na$_2$S$_2$O$_3$·5H$_2$O at a pH of 5.7–6.5 and at 70–75° C. and stirring afterwards for 3 hours under the same conditions. The product obtained is salted out with sodium chloride and isolated as described above.

Example 7

(a) 60.4 parts of the coupling component of the formula (given in Example 2a) are stirred with 350 parts of water, 14 parts of diethyl amine and a sodium hydroxide solution are added until the pH of the solution is adjusted to 10.5–11 and the batch is stirred for 4 hours.

The dyestuff is salted out by means of sodium chloride, the precipitated compound which in the form of the free acid corresponds to the formula

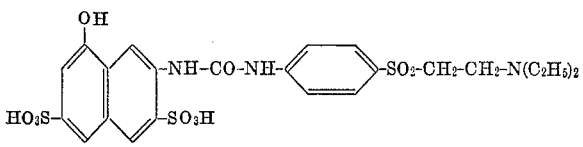

is filtered with suction and washed with a dilute sodium chloride solution.

(b) 17.3 parts of 1-aminobenzene-4-sulfonic acid are diazotized with 17.3 parts of a sodium nitrite solution of 40% strength at 0–5° C. in 100 parts of water and 15 parts of hydrochloric acid of 37% strength. The moist product obtained under (a) is then added thereto, the pH of the solution is adjusted to 6.5–7 by means of a saturated soda solution and the coupling is allowed to terminate at 0–10° C. The dyestuff which in the form of the free acid corresponds to the formula

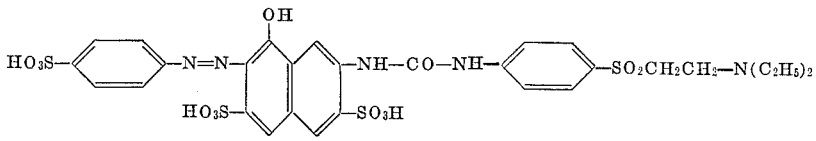

is salted out by means of sodium chloride, filtered with suction, washed with a dilute sodium chloride solution and dried at 60° C. in a vacuum drier.

When applied to cotton in the presence of sodium carbonate or a sodium hydroxide solution, the product yields clear yellowish red prints fast to washing.

Example 8

(a) 31.9 parts of 1-amino-8-hydroxynaphthalene-3,6-disulfonic acid are dissolved to neutral in 150 parts of water with an addition of a sodium hydroxide solution. 45 parts of 3-(β-phenoxyethylsulfonyl)-phenyl-1-isocyanate (melting point: 87° C.) are added as a powder and the whole is stirred overnight at room temperature and at a pH of 6–7. The batch is then diluted with 700 parts of water, filtered, and the filtrate is combined with potassium chloride. The precipitated compound is filtered with suction and washed with a dilute potassium chloride solution.

(b) 22.2 parts of 6-chloro-4-aminotoluene-3-sulfonic acid are diazotized with 17.3 parts of a sodium nitrite solution of 40% strength at 0–5° C. in 100 parts of water and 20 parts of hydrochloric acid of 37% strength. The moist product obtained under (a) is added, the soda solution is neutralized and the coupling is allowed to terminate at a pH of 6.5–7. The dyestuff which in the form of the free acid corresponds to the formula

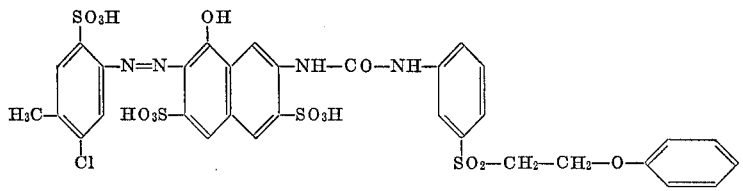

is salted out by means of sodium chloride, filtered with suction, washed with a dilute sodium chloride solution and dried. When applied to cotton, the dyestuff yields scarlet red dyeings and prints fast to wet processing.

Example 9

(a) 319 parts of 2-amino-8-hydroxynaphthalene-3,6-disulfonic acid are dissolved to neutral in 1,500 parts of water with an addition of a sodium hydroxide solution of 33% strength. A solution of 350 parts of 3-(β-acetato-ethylsulfonyl)-phenyl-1-isocyanate (viscous substance) in 650 parts of chlorobenzene, which has been heated to 40° C. is added while carefully stirring, and stirring is continued at room temperature and at a pH of 6–7 until practically no starting product is left. During the first following hour, a total of 1,000 parts of water is added portionwise. Finally, the chlorobenzene is distilled off in vacuo.

(b) 303 parts of 2-aminonaphthalene-1,5-disulfonic acid are diazotized with 173 parts of a sodium nitrite solution of 40% strength at 0–5° C. in 1,000 parts of water, 1,000 parts of ice and 100 parts of hydrochloric acid of 37% strength. The excess amount of acid is neutralized with sodium carbonate, the solution free from chlorobenzene as obtained under (a) is added and its pH is adjusted to 6.5–7 and maintained there by means of a saturated soda solution. After the coupling is complete, the whole is diluted with 7,000 parts of water, clarified and the filtrate is combined with sodium chloride. The precipitated dyestuff which in the form of the free acid corresponds to the formula

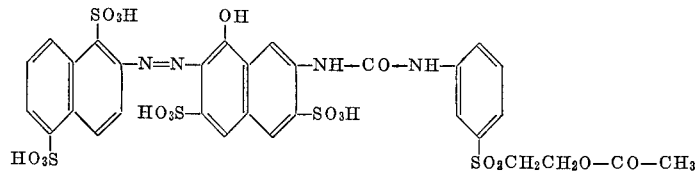

is filtered with suction, washed with a dilute sodium chloride solution and dried.

When applied to cotton, the product yields clear red dyeings and prints fast to wet processing.

Example 10

(a) 478 parts of 4-aminophenyl-β-sulfatoethylsulfone are dissolved to neutral in 3,400 parts of water with an addition of sodium bicarbonate. 340 parts of chloroformic acid phenyl ester are added dropwise, while stirring, to this solution and the pH is maintained at 6.0–7 by simultaneously adding dropwise a saturated soda solution. When a sample of the reaction mixture that has been treated with hydrochloric acid and sodium nitrite does not show any longer a discoloration in an alkaline solution of 2-hydroxynaphthalene-3,6-disulfonic acid, the reaction is complete. Stirring is continued for 2 hours, the precipitated compound of the formula

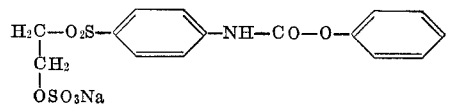

is filtered with suction at 0–10° C. and washed with a sodium chloride solution.

(b) 239 parts of 2-amino-5-hydroxynaphthalene-7-sulfonic acid are dissolved to neutral in 3,000 parts of water with an addition of a sodium hydroxide solution of 33% strength. Within 3 hours, the moist product obtained under (a) is introduced while stirring at 50–60° C. and the pH of the mixture is maintained at 6.8–7.2 by dropwise addition of a saturated soda solution. Stirring is continued for 5 hours at a pH of 6.8–7.2 and at 50–60° C. and then the batch is cooled to room temperature.

(c) 303 parts of 2-aminonaphthalene-1,5-disulfonic acid are diazotized in the manner described in Example 9(b). The solution obtained under (b) is then added thereto and its pH-value is adjusted to 6.5–7 by an addition of a saturated soda solution. When the coupling is complete, the whole is made up to 12,000 parts by volume with water, clarified and the filtrate is combined with potassium chloride. The precipitated dyestuff which in the form of the free acid corresponds to the formula

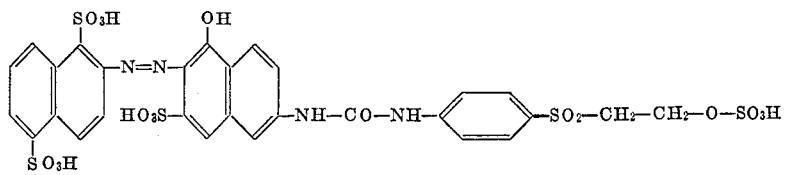

is filtered with suction, washed with a potassium chloride solution and dried. When applied to cotton the product yields strong clear orange dyeings and prints fast to wet processing.

Example 11

(a) 23.9 parts of 2-amino-5-hydroxynaphthalene-7-sulfonic acid are converted into a neutral solution in 200 parts of water with an addition of a sodium hydroxide solution. A solution of 30 parts of 3-(β-chloroethylsulfonyl)-phenyl-1-isocyanate in 60 parts of chlorobenzene is added thereto while carefully stirring. The batch is stirred for another 5 hours at a pH of 6–7 while being diluted with 100 parts of water and then the chlorobenzene is distilled off in vacuo. After another dilution with 500 parts of water, the whole is clarified at 25–30° C. and the filtrate is combined with sodium chloride. The precipitated compound of the formula

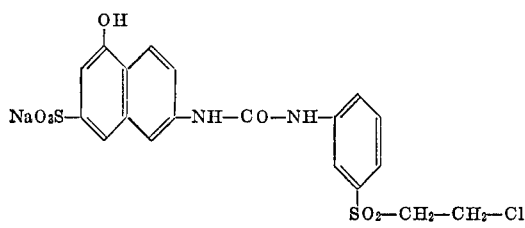

is separated from the mother liquor by filtration or decantation and washed with a sodium chloride solution.

(b) 18.9 parts of 2-amino-1-hydroxybenzene-4-sulfonic acid are diazotized with 17.3 parts of a sodium nitrite solution of 40% strength at 0–5° C. in 200 parts of water, 200 parts of ice and 25 parts of hydrochloric acid of 37% strength. The moist product obtained under (a) is introduced, 20 parts of pyridine are added, the pH is adjusted to 6.5–7 by means of a saturated soda solution and the batch is stirred for about 20 hours at 35–40° C. Sodium chloride is then added, the precipitated product is quickly filtered with suction and the filter residue is stirred with 1,000 parts of water. 25 parts of copper sulfate containing crystal water are added, the pH is adjusted to 5.0–5.5 by means of a soda solution and the batch is stirred for 4 hours at 50–60° C. The dyestuff is then salted out by means of sodium chloride. The dyestuff which in the form of the free acid corresponds to the formula

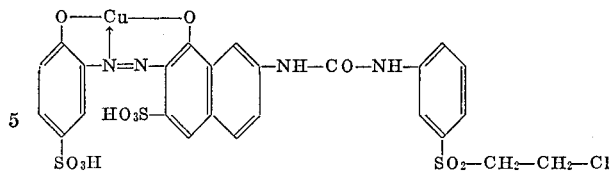

is filtered with suction, washed with a sodium chloride solution and dried. It dyes cotton a bluish red tint having good fastness properties to washing and light.

Example 12

13.7 parts of 1-aminobenzene-2-carboxylic acid are diazotized with 17.3 parts of a sodium nitrate solution of 40% strength at 0–5° C. in 200 parts of water and 25 parts of hydrochloric acid of 37% strength and then 50.7 parts of the coupling component of the formula given in Example 11(a) are added thereto. The pH of the mixture is adjusted to 6.5–7 by means of a saturated soda solution and the batch is stirred at 0–10° C. until the coupling is terminated. 25 parts of chrome alum are then added and while stirring for 8 hours the pH is maintained at 5–6 at 95° C. The solution is clarified in hot condition and the chromium complex dyestuff which in the metal-free acid form corresponds to the formula

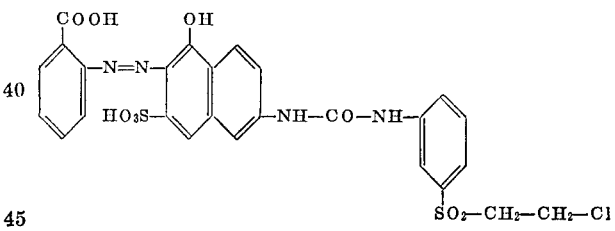

is salted out by means of sodium chloride. The product is filtered with suction, washed with a sodium chloride solution and dried.

When applied to cotton, it yields brown dyeings and prints.

Example 13

18.9 parts of 2-amino-1-hydroxybenzene-4-sulfonic acid are diazotized with 17.3 parts of a sodium nitrite solution of 40% strength, at 0–5° C., in 150 parts of water and 25 parts of hydrochloric acid of 37% strength. The excess amount of acid is neutralized to give a Congo neutral reaction by means of a saturated soda solution and the diazonium salt is then added while stirring to a cold solution of 23.9 parts of 2-amino-8-hydroxynaphthalene-6-sulfonic acid in 150 parts of water and 30 parts of a sodium hydroxide solution of 33% strength. When the coupling is complete, the pH of the solution is adjusted to 4–5 by means of hydrochloric acid and the dyestuff is salted out by means of sodium chloride. The precipitated dyestuff is quickly filtered with suction and stirred with 500 parts of water. 14 parts of cobalt sulfate containing crystal water are added, the pH is adjusted to 5.5–6 by means of a soda solution and the batch is stirred for 3 hours at room temperature. A clear solution is formed. A solution of 30 parts of 3-(β-chloroethylsulfonyl)-phenyl-1-isocyanate in 70 parts of chlorobenzene is added thereto, while carefully stirring, and stirring is continued overnight. The chlorobenzene is distilled off in vacuo and the residue of the flask is made up to 800 parts by volume with water. The batch is clarified at 40° C. and the cobalt complex dyestuff which in the metal-free acid form corresponds to the formula

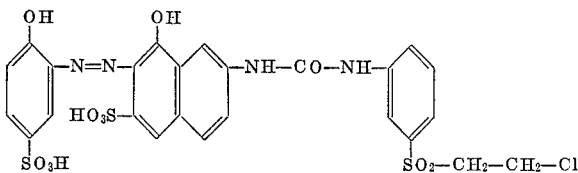

is salted out with sodium chloride. The precipitated product is filtered with suction, washed with a sodium chloride solution and dried. When applied to cotton, it yields bluish brown prints fast to light.

When using instead of 14 parts of cobalt sulfate 25 parts of chrome alum, refluxing at a pH of 5.5–6 until no metal-free dyestuff appears any longer on the paper chromatogram and operating further as described above, there is obtained a chromium complex dyestuff which in the metal-free form corresponds to the formula given above. When applied to cotton, the product yields bluish violet dyeings and prints very fast to light and fast to wet processing.

Example 14

30.3 parts of 2-aminonaphthalene-6,8-disulfonic acid are diazotized with 17.3 parts of a sodium nitrite solution of 40% strength, at 0–5° C., in 200 parts of water and 30 parts of hydrochloric acid of 37% strength. 50.7 parts of the coupling component of the formula given in Example 11(a) are added thereto and the pH of the solution is adjusted to 6.5–7 by means of a saturated aqueous soda solution. This pH-range is maintained at 0–10° C. until the coupling is complete. The sodium chloride is added, the precipitated dyestuff is filtered with suction and the moist filter residue is stirred with 2,000 parts of water. 45 parts of copper sulfate containing crystal water and 75 parts of sodium acetate containing crystal water are then added, the batch is stirred for 30 minutes and, within 2 hours, 50 parts of a hydrogen peroxide solution of 35% strength are added dropwise at a pH of 5.0–5.2 and at a temperature ranging from 20 to 25° C. Stirring is continued overnight and the product is salted out by means of sodium chloride. The precipitated dyestuff which in the form of the free acid corresponds to the formula

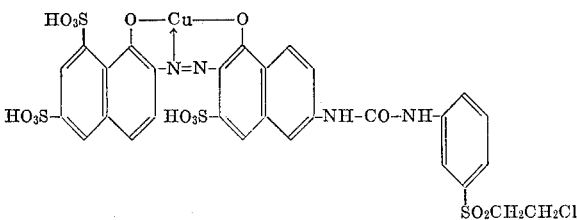

is filtered with suction, washed with a dilute sodium chloride solution and dried.

When applied to cotton, the product yields strong violet dyeings and prints fast to light and to wet processing.

Example 15

(a) 47.8 parts of 1-amino-5-hydroxynaphthalene-7-sulfonic acid are dissolved in 400 parts of water with an addition of sodium hydroxide solution at a pH of 6–7. A solution of 60 parts of 3-(β-chloroethylsulfonyl)-phenyl-1-isocyanate in 135 parts of chlorobenzene, which has been heated to a temperature in the range of from 40–45° C. is added thereto while quickly stirring. After 30 minutes, the batch is diluted with 500 parts of water and is stirred overnight. The chlorobenzene is then distilled off in vacuo and the residue of the flask is made up with water to 8,000 parts by volume. 10 parts of active carbon are added, the batch is heated to a temperature in the range of from 80 to 90° C. and filtered hot. The filtrate is combined with 2,000 parts of sodium chloride and after having been cooled to room temperature, the precipitated coupling component of the formula

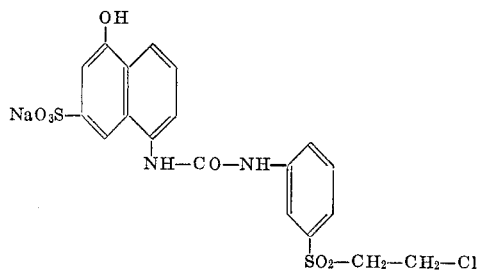

is filtered with suction and washed with a dilute sodium chloride solution.

(b) 40.6 parts of 2-aminoanisol-5-sulfonic acid are diazotized with 34.6 parts of a sodium nitrate solution of 40% strength, at 0–5° C., in 300 parts of water and 40 parts of hydrochloric acid of 37% strength. 114 parts of the coupling component of the formula given under (a) are added thereto, the batch is neutralized by means of a saturated aqueous soda solution and at a pH of 6.5–7 and at 0–10° C., the coupling is allowed to be terminated. The product is salted out by means of sodium chloride, the precipitated dyestuff of the formula

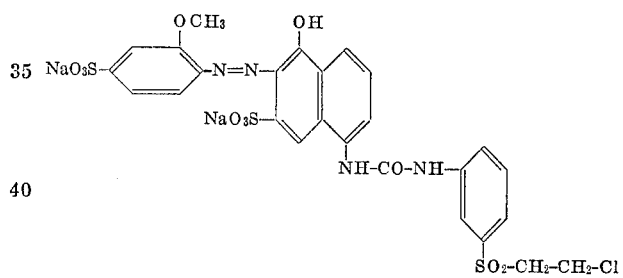

is filtered with suction, washed with a dilute sodium chloride solution and dried at 60° C. in a vacuum drier.

When applied to cotton, the product yields strong red dyeings and prints fast to wet processing.

(c) 74.3 parts of the azo dyestuff of the formula given under (b) which reacts on the fiber are stirred in 400 parts of water. 32 parts of glacial acetic acid, 48.5 parts of sodium acetate containing crystal water and 43 parts of copper sulfate containing crystal water are added thereto and the batch is heated under reflux to the boil for about 5 hours until no metal-free dyestuff is found any longer in the chromatogram.

The batch is subsequently allowed to cool to room temperature and potassium chloride is added thereto. The precipitated dyestuff which in the form of the free acid corresponds to the formula

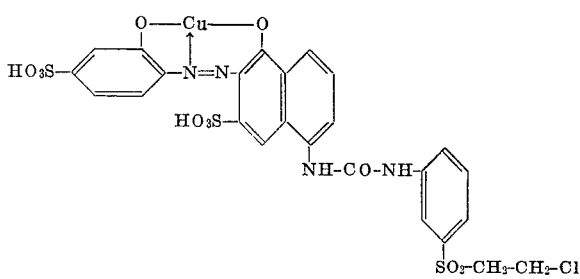

is filtered with suction, washed with an aqueous potassium chloride solution and dried.

When applied to cotton, the product yields violet dyeings and prints which have good to very good fastness properties.

Example 16

79.9 parts of the dyestuff of the formula given in Example 1(b) are introduced into 1,000 parts of water and the pH-value of the mixture is adjusted to 6.5–7 by means of a soda solution. 26 parts of $Na_2S_2O_3 \cdot 5H_2O$ are added thereto and the batch is heated to a temperature in the range of from 90 to 95° C. for 3 hours. The hot solution is clarified and after having been cooled to room temperature the filtrate is salted out by means of sodium chloride. The precipitated dyestuff which in the form of the free acid corresponds to the formula is filtered with suction, washed with a dilute aqueous sodium chloride solution and dried at 50° C. in a vacuum drier. When applied to cotton, the product yields clear yellowish red dyeings and prints fast to light and wet processing.

The following Table II comprises, in column I, further azo dyestuffs of the formula $$R'=-SO_2-CH_2-CH_2-S-SO_3H$$

obtained by the reaction of corresponding β-chloroethylsulfonyl compounds ($R'=-SO_2-CH_2-CH_2-Cl$) with sodium thiosulfate in a manner analogous to that described in Example 16. Column II of the table indicates the tints produced on cotton with these dyestuffs.

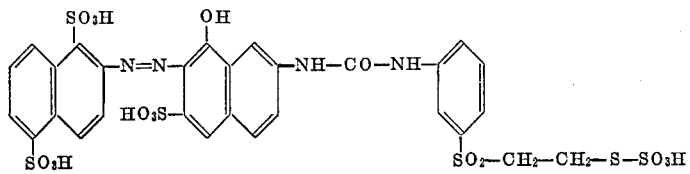

TABLE II

| No. | I ($R'=-SO_2-CH_2-CH_2-S-SO_3H$) | II tint on cotton |
|---|---|---|
| 1 | (structure) | Orange. |
| 2 | (structure) | Do. |
| 3 | Same as above | Yellowish red. |
| 4 | (structure) | Orange. |
| 5 | (structure) | Do. |
| 6 | (structure) | Yellowish red. |

TABLE II—Continued

| No. | I (R'=—SO₂—CH₂—CH₂—S—SO₃H) | II tint on cotton |
|---|---|---|
| 7 | 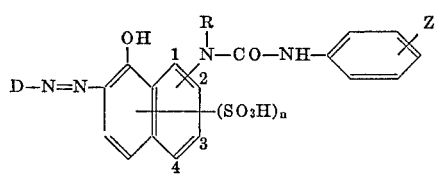 (structure) | Orange. |
| 8 | (structure) | Do. |
| 9 | (structure) | Scarlet. |
| 10 | (structure) | Do. |

We claim:

1. A complex copper, nickel, chromium or cobalt monoazo-dyestuff of the formula

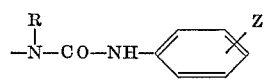

in which D is hydroxyphenylene, hydroxy-monosulfophenylene, hydroxy-nitro-phenylene hydroxy-monosulfo-naphthylene, hydroxy-disulfo-naphthylene or carboxyphenylene, R is hydrogen or lower alkyl, Z is —SO₂—CH₂—CH₂—Cl, —SO₂—CH₂—CH₂—O—SO₃H
—SO₂—CH₂—CH₂—S—SO₃H, —SO₂—CH₂—CH₂—O—⟨phenyl⟩
—SO₂—CH₂—CH₂—N-(lower alkyl)₂ or
—SO₂—CH₂—CH₂—O—CO—CH₃ and n is an integer 1 or 2, the grouping $$-\underset{R}{N}-CO-NH-\text{⟨phenyl⟩}-Z$$

being linked at the 2-, 3- or 4-position of the naphthalene nucleus, the copper and nickel containing dyestuffs representing 1:1-complex compounds, and the chromium and cobalt containing dyestuffs representing 2:1-complex compounds.

2. A dyestuff of the formula

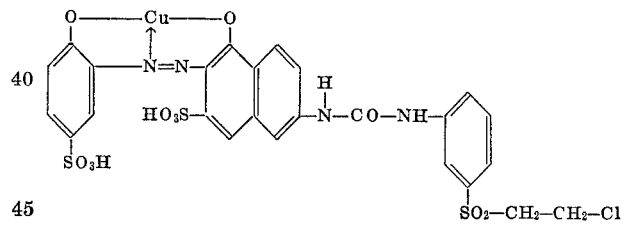

3. A 2:1-chromium complex compound of the monoazo-dyestuff of the formula

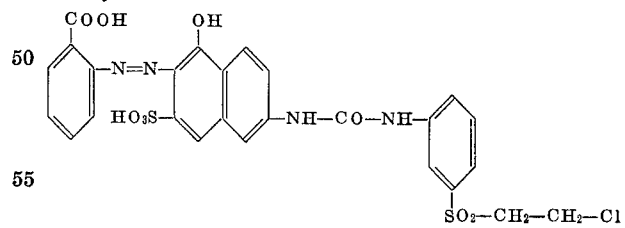

4. A 2:1 cobalt complex compound of the monoazo-dyestuff of the formula

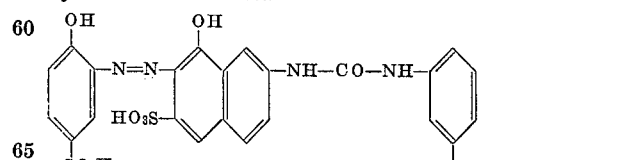

5. A 2:1 chromium complex compound of the monoazo-dyestuff of the formula

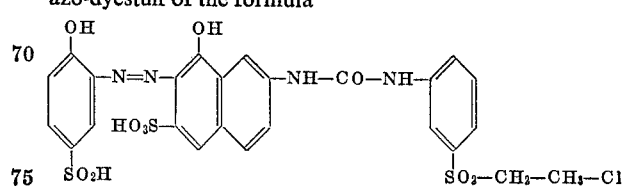

6. A dyestuff of the formula
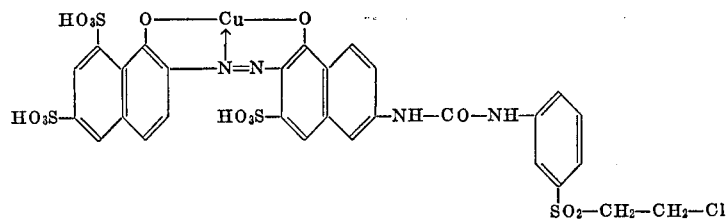
7. A dyestuff of the formula
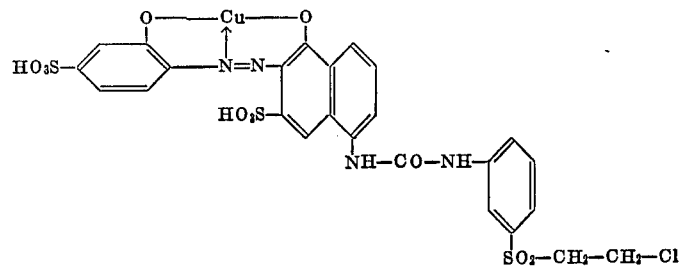
References Cited
UNITED STATES PATENTS
| | | | |
|---|---|---|---|
| 2,128,325 | 8/1938 | Rose | 260—151 |
| 3,098,096 | 7/1963 | Freeman | 260—194 X |
| 3,135,730 | 6/1964 | Heyna et al. | 260—199 X |
| 3,207,745 | 9/1965 | Dussy et al. | 260—151 X |
CHARLES B. PARKER, Primary Examiner
C. F. WARREN, Assistant Examiner
U.S. Cl. X.R.
8—42, 43; 260—146, 148, 149, 151, 152, 156, 189, 190, 191, 194, 199